Patented Nov. 23, 1948

2,454,294

UNITED STATES PATENT OFFICE 2,454,294

COMPOSITIONS OF MATTER AND METHOD OF MAKING SAME

John C. Sauer, Wilmington, Del., assignor to E. I. du Pont de Nemours & Company, Wilmington, Del., a corporation of Delaware No Drawing. Application November 7, 1944, Serial No. 562,383

12 Claims. (Cl. 260—23)

This invention relates to new compositions of matter and to methods for their preparation.

It has heretofore been proposed to incorporate vinyl resins into natural drying and semi-drying oils. In all such prior processes the oil is given either a bodying treatment or else is blended with a varnish gum prior to interpolymerization with the monomeric vinyl compound. This operates to give products of high viscosity and coating compositions made therefrom are inherently of low solids content under practical conditions of use.

It has now been unexpectedly discovered that synthetic drying oils of the type disclosed and claimed in the copending application of Martin E. Cupery, Serial Number 372,391, filed December 30, 1940, now Patent 2,381,880, can be polymerized with vinyl or vinylidene compounds, and butenedioic acid esters without the necessity of giving the oil the pretreatment necessary with drying and semi-drying natural oils. This has marked practical advantages because it eliminates one processing operation and yields low viscosity products which have the vinyl or vinylidene compound, or butenedioic acid ester, chemically combined. These advantages are obtained without sacrifice in the excellent film qualities possessed by the synthetic drying oils of the type referred to, e. g., very rapid air drying qualities with excellent flexibility and high degree of toughness in the dry films; moreover, by appropriately selecting the synthetic drying oil and the vinyl or vinylidene compound or butenedioic acid ester, products possessing widely varying properties may be obtained, thus making it possible to design the product for the application in which it is to be used.

It is accordingly an object of this invention to provide new compositions of matter which contain a synthetic drying oil (as defined below) chemically combined with either a vinyl compound, a vinylidene compound, or a saturated alcohol ester of a butenedioic acid.

It is another object to provide new compositions combining the qualities of rapid air drying with toughness and flexibility in dry films.

It is a final object to provide methods for preparing the said compositions.

By the term "synthetic drying oils," as used herein, is meant a mixed ester of polyhydric alcohol and a plurality of monocarboxylic acids, one of which is an $\alpha,\beta$-unsaturated monocarboxylic acid.

By the term "$\alpha,\beta$-unsaturated monocarboxylic acid," as used herein, is meant acids which have but one carboxyl group and which have an ethylenic group adjacent to the carboxyl group. These acids can be substituted on the $\alpha$ or $\beta$ carbon by a monovalent atom, e. g., halogen, or a monovalent radical such as an acyclic, carbocyclic, or heterocyclic group.

The acids referred to in the preceding paragraph convey to the synthetic drying oils, in which the other acid is an unsaturated monocarboxylic acid, e. g., an acid derived from a natural drying or semi-drying oil, the ability to air dry at a more rapid rate to yield films of improved quality as compared with the corresponding natural oils. These $\alpha,\beta$-unsaturated monocarboxylic acids, when used in the proper amount, also confer the ability to dry to synthetic drying oils in which the other acid is of a type other than a natural drying or semi-drying oil acid.

The monofunctional monocarboxylic acids used in the preparation of the synthetic drying oils are preferably the acids derived from natural drying or semi-drying oils.

Convenient methods for preparing the synthetic drying oils are described in the copending application of Martin E. Cupery, S. N. 372,391, now Patent 2,381,880, referred to above.

Broadly the objectives of this invention are attained by subjecting a mixture of one of the synthetic drying oils described above, a peroxy compound as a catalyst, and a monomeric vinyl compound, vinylidene compound, or saturated alcohol ester of a butenedioic acid, to polymerizing conditions, preferably in the presence of an inert organic solvent. After polymerization is complete the composition may be freed of solvent and catalyst, if desired.

By the term "vinylidene compounds," as used in the claims, is meant compounds derived from the radical $CH_2=C<$, but containing no more than one of these groups in the monomer. As shown by compounds specifically disclosed herein, one of these free bonds may be satisfied by hydrogen to form vinyl compounds.

The more detailed practice of the invention is illustrated in the following examples wherein the amounts of the ingredients are by weight, such examples being given by way of illustration and not as a limitation. In these examples, unless otherwise stated, viscosities are given in poises at 25° C. and colors are given on the Gardner-Holdt Scale, and the hydroxyl numbers are all corrected for acidity.

EXAMPLE 1

*Glycerol mixed ester of linseed oil acids and $\beta$-(2-furyl) acrylic acid*

Two hundred eight (208) parts of alkali refined linseed oil, 11.1 parts of refined glycerol, 49.2 parts of $\beta$-(2-furyl) acrylic acid (melting point 140–141° C.; Gibson and Kahnweiler, Am. Chem. J. 12, 314 (1890)) and 0.25 part of sodium hydrogen sulfate monohydrate are heated in the presence of 10 parts of toluene at 200–225° C. under an atmosphere of carbon dioxide. The toluene and water which distill are condensed, the water is separated, and the toluene returned to the reaction vessel. Heating is continued for 5 hours and the product is then blown with carbon dioxide for about 0.5 hour to remove toluene. After cooling the product is filtered and analyzed. It is found to have the following physical and analytical values: $N_D^{25}$, 1.4997; $d_4^{25}$, 0.9802; hydroxyl No. 2.1; iodine No. 185; saponification No. 260; acid No. 3.2; viscosity 1; color 4.2.

A polymer of the above synthetic drying oil with methyl methacrylate is prepared as follows:

In a reactor fitted with a reflux condenser, thermometer, and stirrer is placed a mixture of 129 parts of methyl methacrylate, 129 parts of xylene, and 43 parts of the synthetic drying oil and 1.3 parts of benzoyl peroxide and the mixture heated at 110° C. for 9 hours under a carbon dioxide blanket. Thereafter the reaction mixture is subjected to distillation to remove unreacted methyl methacrylate and xylene. The product obtained is a hard, clear resin which by analysis is found to contain about 60% of combined methyl methacrylate. Solutions in hydrocarbon solvents dry in air at ordinary temperatures in a few minutes to yield clear, tough, tack-free films which show good adhesion to the substrate on which they are cast.

EXAMPLE 2

A reactor fitted with a stirrer, reflux condenser, and thermometer is charged with a mixture of 160 parts of methyl methacrylate, 240 parts of the mixed glyceride of $\beta$-(2-furyl)acrylic acid and linseed oil acids of Example 1, and 8 parts of benzoyl peroxide. The reactor is swept with carbon dioxide to remove oxygen and then heated rapidly to about 120° C., while maintaining an atmosphere of carbon dioxide over the reaction mixture. The progress of the reaction is followed by sampling at intervals. Analysis of a sample removed after 0.5 hour indicates the product to contain approximately 18% of combined methyl methacrylate. The viscosity of the product at this stage is 0.65 at a concentration of 70% in high-flash naphtha. (A coal tar naphtha having a distillation range of 140°–210° C., a flash point of 126° F., and a specific gravity at 25° C. of 0.856 to 0.881). After 2.5 hours of reaction at 110°–120° C. the product contains about 24% of combined methyl methacrylate and has a viscosity of 3.45 at a concentration of 70% solids in high-flash naphtha.

A composition is prepared by blending the product containing 24% methyl methacrylate with a 52% linseed oil modified alkyd resin pigmented with equal parts of titanium dioxide and antimony oxide in amount sufficient to give a binder/pigment ratio of 1:1. The binder composition in the resulting product contains 18.5% combined methyl methacrylate, 65% mixed ester, and 16.5% alkyd resin. With 0.06% cobalt (as cobalt naphthenate), based on the binder, the composition dries to a tack-free, hard glossy film in about 2 hours at room temperature.

EXAMPLE 3

A mixture of 32 parts styrene, 96 parts of xylene, 96 parts of the glycerol mixed ester of linseed oil acids with $\beta$-(2-furyl)acrylic acid of Example 1, and 0.965 part of benzoyl peroxide is heated under a carbon dioxide blanket at 140°–142° C. for 5.5 hours in a reactor fitted with a stirrer, thermometer and reflux condenser. The xylene and unreacted styrene are removed by distillation in vacuum over a steam bath. A clear oil having a viscosity of 2 and a color of 5.3 is obtained in a yield of 107 parts. The combined styrene content is 9.3%. With 0.03% cobalt (as cobalt naphthenate) the oil dries dust-free in 2.5 hours and tack-free in 3.5 hours, giving a hard film after over-night aging, at room temperature.

EXAMPLE 4

A mixture of 96 parts of styrene, 96 parts of xylene, 32 parts of the mixed ester of Example 1, and 0.96 part of benzoyl peroxide is heated under a carbon dioxide blanket at 140°–143° C. for 5.5 hours in a reactor fitted with a stirrer, reflux condenser and thermometer. The xylene and unreacted styrene are removed by vacuum distillation over a steam bath, yielding 78 parts of a light-colored heavy syrup which is soluble in toluene, xylene or high-flash naphtha but insoluble in mineral spirits. The weight yield of product indicates 58% combined styrene. At 50% solids in toluene the product has a viscosity of 1.25 and a color of 3.1. With 0.03% cobalt (cobalt naphthenate), based on total solids, the solution dries dust-free in 15 minutes and tack-free in about 1 hour at room temperature, giving a hard, tough film.

The above examples have been selected with the object of indicating that the invention is generically applicable to organic compounds having ethylenic unsaturation, and specifically to vinyl compounds, vinylidene compounds, and saturated alcohol esters of butenedioic acids. Thus, in place of the vinyl and vinylidene compounds of the examples, there can be used other vinyl and vinylidene compounds and saturated alcohol esters of butenedioic acids such as 1,1-dichloroethylene; 2-chloropropene-1; tetrafluoroethylene; vinylidene fluoride; vinyl ethers; ketones and esters, such as methyl and propyl vinyl ethers, methyl and ethyl vinyl ketones, vinyl chloroacetate, vinyl chloride, vinyl acetate, vinyl propionate, n-vinyl phthalimide, vinyl thiolacetate, methyl vinyl thioether, methyl vinyl sulfone, vinyl carbazole, and vinyl sulfonic esters; acrylic and methacrylic acids and their esters, amides, imides, and nitriles, e. g., ethyl, propyl, butyl, and amyl acrylates, and methacrylates; $\alpha$-halo-acrylic acids and their esters such as methyl $\alpha$-chloroacrylate; esters of itaconic acids, e. g., methyl and ethyl itaconate; saturated alcohol esters of maleic and fumaric acids, e. g., methyl and ethyl maleates and fumarates; unsaturated alcohol esters of dicarboxylic acids, e. g., allyl and methallyl maleates, fumarates, or succinates.

The mixed esters polymerized with the vinyl and vinylidene compounds and saturated alcohol esters of butenedioic acids can be made by reacting the polyhydric alcohol with the $\alpha,\beta$-unsaturated acid (or an esterifiable derivative) and the other acid simultaneously or successively. If desired a polyhydric alcohol partially acylated with either the $\alpha,\beta$-unsaturated acid or the other acid or acids can be reacted with the remaining acid or acids. Alternatively, an ester of either the $\alpha,\beta$-unsaturated acid or the other acid can be reacted with the remaining acid or acids in the presence of more polyhydric alcohol and an alcoholysis catalyst present in small amount, suitably from 0.001% to 1%.

Suitable types of esterifiable derivatives of both the $\alpha,\beta$-unsaturated acid and the monofunctional monocarboxylic acid of different structure are the anhydrides, acid halides, and esters with alcohols more volatile than the polyhydric alcohol whose ester is to be prepared.

Solvents and other preparative details should be adjusted to the method chosen, the method of so doing being apparent to one skilled in the art.

In addition to glycerol there can be used other polyhydric alcohols, such as hexamethylene glycol, pentaerythritol, methyl trimethylol methane, erythritol, p,p'-di(2-hydroxyethyl)benzene, decamethylene glycol, diethylene glycol, sorbitol, and cyclohexyl-1,2-carbinol.

In addition to β-(2-furyl)acrylic acid, other α,β-unsaturated monocarboxylic acids that can be used include, for example, octatrien-2,4,6-oic acid, 7-phenylheptatrien-2,4,6-oic acid, Δ-1,3-cyclopentadien carboxylic acid, 5-cyclohexyl pentadien-2,4-oic acid, 3(Δ-1,3-cyclohexadienyl) propanoic acid, octatrien-2,4,6-carboxylic acid-4, 2-phenylhexadien-2,4-oic acid, 4-methyl heptadien-2,4-oic acid, 5,9-dimethyl decatrien-2,4,8-oic acid, β-ionylideneacetic acid, 3,5,-dimethylhexadien-2,4-oic acid, β-2-(5 chlorofuryl)acrylic acid, β-(2-thienyl)acrylic acid, and α-cyanohexadien-2,4-oic acid.

Examples of monofunctional monocarboxylic acids of different structure than the α,β-unsaturated acid, in addition to linseed oil acids and soya oil acids, include perilla oil acids, oiticica oil acids, lauric acid, p-toluic acid, crotonic acid, corn oil acids, cotton seed oil acids, quinolinic acid, α-naphtholic acid, oleic acid, stearic acid, and phenoxyacetic acid. The acid may be aromatic or aliphatic, open or closed chain and, if the latter, monocyclic, polycyclic, hemocyclic or heterocyclic, saturated or unsaturated, straight or branched chain and substituted or not by other groups or atoms, such as ether, ketone or halogen, which do not interfere with the desired esterification reaction.

Although benzoyl peroxide has been used as the catalyst in the examples, other peroxy compounds can be used to catalyze the polymerization. Among such may be mentioned lauroyl peroxide, acetylbenzoyl peroxide, diethyl dioxide, succinyl peroxide and urea peroxide. The concentration of catalylst may vary from 1% up to 10% and more on total polymerizable monomer present in the composition.

The procedure in the above examples can be varied widely. Thus the solvent can be omitted but it is generally preferred to employ a hydrocarbon solvent since it permits preparation of homogeneous products most expeditiously.

The heating period can be shortened or lengthened materially and the temperature can also be varied widely. Thus, depending upon the amount of vinyl or vinylidene compound or saturated alcohol ester of a butenedioic acid which it is desired to copolymerize with the mixed ester, the heating period can be varied from 0.5 hour up to 10–15 hours. Generally, however, the reaction is essentially complete in 5 or 6 hours. Temperatures between 90° and 150° C. yield preferred results, although other temperatures can be used.

The other factors in the examples are also flexible. In some instances it is necessary to polymerize under pressure, e. g., when the vinyl derivative is gaseous under normal temperatures. In such instances pressures up to 1000 lb./sq.in. can be used.

Where desired, anti-darkening agents, such as alkali metal bisulfites, can be added to the reaction mixture before polymerization to insure a product of excellent color. The viscosity of the resulting solution can be adjusted by appropriate methods.

As a rule the most useful products are those containing from about 5% to about 75% by weight of combined vinyl or vinylidene compound or butenedioic acid ester.

Increasing the ratio of vinyl or vinylidene compounds, or saturated alcohol ester of a butenedioic acid component, to mixed ester in the reaction mixture generally results in an increase in the proportion of combined components. An increase in the proportion of combined vinyl, vinylidene or saturated alcohol ester of a butenedioic acid component can also be realized by bubbling air through the product during the reaction.

Generally, as the proportion of vinyl or vinylidene compounds, or saturated alcohol ester of a butenedioic acid components in the composition increases, the rate of drying and yellowing resistance of the product increase, but this is accompanied by an increase in viscosity. With a small amount of vinyl or vinylidene compound or saturated alcohol ester of a butenedioic acid the drying rate to the tack-free stage is markedly improved without appreciably affecting the time during which the film remains "open" for satisfactory brushing.

The products of this invention are especially useful as ingredients of coating compositions in the paint and varnish field. For example, they may be used directly or they may be formulated into compositions by either grinding with pigments or by using them as let-down agents for standard mill bases. The products may be compounded or mixed with natural oils, fillers or solvents. These compositions can be applied to any kind of surface or material, for example, to metal, wood, paper, linen, silk or cotton textiles. The products are also of use in such applications as impregnating agents for paper and wood materials, as ingredients of adhesives, as printing inks, as waterproofing agents, or for artificial leather coatings.

It is apparent that many widely different embodiments of this invention may be made without departing from the spirit and scope thereof; and, therefore, it is not intended to be limited except as indicated in the appended claims.

I claim:

1. A composition of matter comprising an interpolymer of a polyhydric alcohol mixed ester of a monocarboxylic acid containing an ethylenic double bond α,β to the carboxyl group and at least one other ethylenic double bond conjugated therewith and a monofunctional monocarboxylic acid of the group which consists of natural drying oils and semi-drying oils, and a monomeric polymerizable member of the group which consists of vinylidene compounds containing a single $CH_2=C<$ radical and saturated alcohol esters of butenedioic acids, in which the mixed ester constitutes from 25 to 95% and the monomeric polymerizable member constitutes 5 to 75% of the final product.

2. A composition of matter comprising an interpolymer of a polyhydric alcohol mixed ester of a hexadien-2,4-oic acid and a monofunctional monocarboxylic acid of the group which consists of natural drying oils and semi-drying oils, and a monomeric polymerizable member of the group which consists of vinylidene compounds containing a single $CH_2=C<$ radical and saturated alcohol esters of butenedioic acids, in which the mixed ester constitutes from 25 to 95% and the monomeric polymerizable member constitutes 5 to 75% of the final product.

3. A composition of matter comprising an interpolymer of a polyhydric alcohol mixed ester of a β-furylacrylic acid and a monofunctional monocarboxylic acid of the group which consists of natural drying oils and semi-drying oils, and a monomeric polymerizable member of the group which consists of vinylidene compounds containing a single CH$_2$=C<radical and saturated alcohol esters of butenedioic acids, in which the mixed ester constitutes from 25 to 95% and the monomeric polymerizable member constitutes 5 to 75% of the final product.

4. A composition of matter comprising an interpolymer of a polyhydric alcohol mixed ester of β-(2-furyl)acrylic acid and the acids of a fatty oil and a monomeric polymerizable member of the group which consists of vinylidene compounds containing a single CH$_2$=C<radical and saturated alcohol esters of acids in which the mixed ester constitutes from 25 to 95% and the monomeric polymerizable member constitutes 5 to 75% of the final product.

5. A composition of matter comprising an interpolymer of a polyhydric alcohol mixed ester of β-(2-furyl)acrylic acid and the acids of linseed oil and a monomeric polymerizable member of the group which consists of vinylidene compounds containing a single CH$_2$=C<radical and saturated alcohol esters of butenedioic acids in which the mixed ester constitutes from 25 to 95% and the monomeric polymerizable member constitutes 5 to 75% of the final product.

6. A composition of matter comprising an interpolymer of a polyhydric alcohol mixed ester of β-(2-furyl)acrylic acid and the acids of soya oil and a monomeric polymerizable member of the group which consists of vinylidene compounds containing a single CH$_2$=C<radical and saturated alcohol esters of butenedioic acids in which the mixed ester constitutes from 25 to 95% and the monomeric polymerizable member constitutes 5 to 75% of the final product.

7. The method of making compositions of matter which comprises heating a polyhydric alcohol mixed ester of a monocarboxylic acid containing an ethylenic double bond α,β to the carboxyl group and at least one other ethylenic double bond conjugated therewith and a monofunctional monocarboxylic acid of the group which consists of natural drying oils and semi-drying oils, with a peroxy compound catalyst and a monomeric polymerizable member of the group which consists of vinylidene compounds containing a single CH$_2$=C<radical and saturated alcohol esters of butenedioic acids in an inert atmosphere until they are interpolymerized, in which the mixed ester constitutes from 25 to 95% and the monomeric polymerizable member constitutes 5 to 75% of the final product.

8. The method of making compositions of matter which comprises heating a polyhydric alcohol mixed ester of a monocarboxylic acid containing an ethylenic double bond α,β to the carboxyl group and at least one other ethylenic double bond conjugated therewith and a monofunctional monocarboxylic acid of the group which consists of natural drying oils and semi-drying oils with methyl methacrylate, a peroxy compound catalyst and a solvent in an inert atmosphere until they are interpolymerized, then subjecting the reaction mixture to distillation to remove unreacted methyl methacrylate and solvent, in which the mixed ester constitutes from 25 to 95% and the methyl methacrylate constitutes 5 to 75% of the final product.

9. The method of making compositions of matter which comprises heating a polyhydric alcohol mixed ester of a monocarboxylic acid containing an ethylenic double bond α,β to the carboxyl group and at least one other ethylenic double bond conjugated therewith and a monofunctional monocarboxylic acid of the group which consists of natural drying oils and semi-drying oils with styrene, a peroxy compound catalyst and a solvent in an inert atmosphere until they are interpolymerized, then subjecting the reaction mixture to distillation to remove unreacted styrene and solvent, in which the mixed ester constitutes from 25 to 95% and the styrene constitutes 5 to 75% of the final product.

10. A composition of matter comprising an interpolymer of a glycerol mixed ester of β-(2-furyl)acrylic acid and the acids of a fatty oil and a monomeric polymerizable member of the group which consists of vinylidene compounds containing a single CH$_2$=C<radical and saturated alcohol esters of butenedioic acids, in which the mixed ester constitutes from 25 to 95% and the monomeric polymerizable member constitutes 5 to 75% of the final product.

11. A composition of matter comprising an interpolymer of a glycerol mixed ester of a monocarboxylic acid containing an ethylenic double bond α,β to the carboxyl group and at least one other ethylenic double bond conjugated therewith and a monofunctional monocarboxylic acid of the group which consists of natural drying oils and semi-drying oils, and a monomeric polymerizable member of the group which consists of vinylidene compounds containing a single CH$_2$=C<radical and saturated alcohol esters of butenedioic acids, in which the mixed ester constitutes from 25 to 95% and the monomeric polymerizable member constitutes 5 to 75% of the final product.

12. The method of making compositions of matter which comprises heating a glycerol mixed ester of a monocarboxylic acid containing an ethylenic double bond α,β to the carboxyl group and at least one other ethylenic double bond conjugated therewith and a monofunctional monocarboxylic acid of the group which consists of natural drying oils and semi-drying oils, with a peroxy compound catalyst and a monomeric polymerizable member of the group which consists of vinylidene compounds containing a single CH$_2$=C<radical and saturated alcohol esters of butenedioic acids in an inert atmosphere until they are interpolymerized, in which the mixed ester constitutes from 25 to 95% and the monomeric polymerizable member constitutes 5 to 75% of the final product.

JOHN C. SAUER.

REFERENCES CITED

The following references are of record in the file of this patent:

UNITED STATES PATENTS

| Number | Name | Date |
|---|---|---|
| 2,129,694 | Izard | Sept. 13, 1938 |
| 2,160,532 | Barrett et al. | May 30, 1939 |

Certificate of Correction

Patent No. 2,454,294. November 23, 1948.

JOHN C. SAUER

It is hereby certified that errors appear in the printed specification of the above numbered patent requiring correction as follows:

Column 3, line 8, for the number "1,4997" read *1.4997*; line 18, for "1.3. parts" read *1.3 parts*; line 65, after the word "hard" insert a comma; column 5, line 33, for "α-naphtholic" read *α-naphthoic*; line 36, for "hemocyclic" read *homocyclic*; column 6, line 7, before *butenedioic*; insert *saturated alcohol ester of a*; same line, strike out "ester"; line 15, for "component" read *components*; column 7, line 21, claim 4, before "acids" insert *butenedioic*; column 8, line 1, for "uncreated" read *unreacted*;

and that the said Letters Patent should be read with these corrections therein that the same may conform to the record of the case in the Patent Office.

Signed and sealed this 6th day of September, A. D. 1949.

[SEAL]

THOMAS F. MURPHY,
*Assistant Commissioner of Patents.*